(12) United States Patent
Parthasarathy et al.

(10) Patent No.: US 9,167,021 B2
(45) Date of Patent: Oct. 20, 2015

(54) MEASURING WEB BROWSING QUALITY OF EXPERIENCE IN REAL-TIME AT AN INTERMEDIATE NETWORK NODE

(75) Inventors: Kannan Parthasarathy, Palo Alto, CA (US); Nicholas James Stavrakos, Los Altos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 265 days.

(21) Appl. No.: 13/436,671

(22) Filed: Mar. 30, 2012

(65) Prior Publication Data

US 2013/0262659 A1  Oct. 3, 2013

(51) Int. Cl.
| G06F 15/173 | (2006.01) |
| H04L 29/08 | (2006.01) |
| H04L 12/24 | (2006.01) |
| H04L 12/26 | (2006.01) |

(52) U.S. Cl.
CPC ............ H04L 67/02 (2013.01); H04L 41/5067 (2013.01); H04L 41/5083 (2013.01); H04L 43/16 (2013.01)

(58) Field of Classification Search
USPC ........................................................ 709/224
See application file for complete search history.

(56) References Cited

U.S. PATENT DOCUMENTS

| 7,403,487 B1 | 7/2008 | Foladare et al. |
| 2002/0065911 A1* | 5/2002 | von Klopp et al. ............ 709/224 |
| 2002/0120727 A1 | 8/2002 | Curley et al. |
| 2003/0005113 A1 | 1/2003 | Moore |
| 2005/0071307 A1 | 3/2005 | Snyder |
| 2007/0061339 A1 | 3/2007 | Douglet et al. |
| 2009/0088188 A1* | 4/2009 | Wormald et al. ............. 455/466 |
| 2010/0269044 A1 | 10/2010 | Ivanyi et al. |
| 2011/0271309 A1 | 11/2011 | Chetlur et al. |
| 2012/0110167 A1 | 5/2012 | Joch et al. |
| 2012/0117225 A1 | 5/2012 | Kordasiewicz |
| 2012/0140624 A1 | 6/2012 | Denman et al. |
| 2012/0191841 A1* | 7/2012 | Swamidas et al. ............ 709/224 |

(Continued)

FOREIGN PATENT DOCUMENTS

| EP | 2480001 A2 | 7/2012 |
| EP | 2530870 A1 | 12/2012 |

(Continued)

OTHER PUBLICATIONS

PCT International Search Report; related to Application No. PCT/US2013/034713; dated (mailed) Aug. 19, 2013 (3 pgs.).

(Continued)

*Primary Examiner* — Vivek Srivastava
*Assistant Examiner* — Karina J Garcia-Ching
(74) *Attorney, Agent, or Firm* — Finnegan, Henderson, Farabow, Garrett & Dunner, LLP (57) ABSTRACT

A method including acquiring a current HTTP transaction; determining whether the current HTTP transaction relates to web browsing for a specific client; acquiring a previous transactions set of the specific client; evaluating whether the current HTTP transaction belongs with the previous transactions set; if the current HTTP transaction belongs with the previous transactions set, adding the current HTTP transaction to the previous transactions set; and if the current HTTP transaction does not belong with the previous transactions set, creating a boundary of a page unit that includes the HTTP transactions of the previous transactions set for computing a page unit time.

43 Claims, 5 Drawing Sheets (56) References Cited

U.S. PATENT DOCUMENTS

| | | | |
|---|---|---|---|
| 2012/0246310 A1* | 9/2012 | Broda et al. | 709/224 |
| 2013/0182579 A1 | 7/2013 | Turgeon et al. | |
| 2013/0219048 A1* | 8/2013 | Arvidsson et al. | 709/224 |
| 2013/0223207 A1 | 8/2013 | Bouchard et al. | |
| 2013/0263167 A1 | 10/2013 | Parthasarathy et al. | |

FOREIGN PATENT DOCUMENTS

| | | |
|---|---|---|
| EP | 2632100 A1 | 8/2013 |
| WO | WO-03/081883 A1 | 10/2003 |
| WO | WO-2010/069372 A1 | 6/2010 |
| WO | WO-2010/100315 A1 | 9/2010 |
| WO | WO-2011/065692 A2 | 6/2011 |
| WO | WO-2011/119439 A2 | 9/2011 |
| WO | WO-2012/055022 A1 | 5/2012 |
| WO | WO-2012/055023 A1 | 5/2012 |

OTHER PUBLICATIONS

PCT Written Opinion of the International Searching Authority; related to Application No. PCT/US2013/034713; dated (mailed) Aug. 19, 2013 (4 pgs.).

PCT International Search Report and Written Opinion issued in Application No. PCT/US2013/034708 dated Jul. 26, 2013; 9 pages.

PCT International Search Report and Written Opinion issued in Application No. PCT/US2014/053588 dated Nov. 6, 2014; 9 pages.

Gahbiche Msakni, H. et al.; "Is QoE estimation based on QoS parameters sufficient for video quality assessment?"; 2013 9th International Wireless Communications and Mobile Computing Conference; Jul. 1, 2013; pp. 538-544.

Extended European Search Report issued in European Application No. 13768473.4, dated Mar. 4, 2015; 7 pages.

Extended European Search Report issued in European Application No. 13769049.1, dated Mar. 18, 2015; 4 pages.

* cited by examiner

MEASURING WEB BROWSING QUALITY OF EXPERIENCE IN REAL-TIME AT AN INTERMEDIATE NETWORK NODE

BACKGROUND INFORMATION

The amount of time needed to download a web page is an important indicator of the quality of a user's experience when browsing web sites on the Internet. Downloading a web page involves many transactions at several levels. At the Transmission Control Protocol/Internet Protocol (TCP/IP) level, one or more TCP connections are established between the client and the server. Once the connection is established, at the Hypertext Transfer Protocol (HTTP) level, several request-response transactions are carried out to complete a web page download. The first HTTP request from the client fetches the top level HyperText Markup Language (HTML) content for the web page. The web browser then parses the retrieved HTML content and sends out additional HTTP requests to the content server for all embedded objects such as Java Script objects, Cascading Style Sheet (CSS) objects, and image objects. The client device can monitor when a web page request started and when the last HTTP response associated with the web page was received.

Because the client has this monitoring capability, measuring the time needed to download a web page can be straightforward when the measurement is made at the client. This can be done by starting a timer when the first HTTP request to the content server is sent, and stopping the timer when the last HTTP object is received and the web page is completely rendered in a client application such as the web browser.

Measuring the web page download time at the content server is also relatively straightforward if all the content is served from the same server. The server also has complete knowledge to determine the first and last HTTP transaction corresponding to a web page download from a client. The measurement, however, becomes complicated if content for a single web page is distributed across several physical servers in order to distribute load or due to partnerships with third party content providers such as advertisements providers. In these circumstances, a single content server may not have all the information to determine the time taken to download a complete web page.

Moreover, an intermediate network node also may not have all information to determine the time taken to download a complete web page. An intermediate network node can, in theory, parse HTML content served from content servers and determine the composition of a web page including all the embedded objects in the page. But since dynamic Universal Resource Locators (URLs) that are generated by execution of Java Script on the client cannot be predicted, access to HTTP cookies that are stored only on the client may be required in order to measure the time taken to download the complete web page. Thus it is practically not feasible to accurately measure the time taken to download a web page at an intermediate network node located between a client and a server.

DETAILED DESCRIPTION OF DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The embodiments described herein provide a way for Service Providers providing access to the Internet to measure Quality of Experience (QoE) of subscribers browsing web pages on the Internet. The QoE measurement can be based in part on the time it takes to download web pages. This measurement or web QoE score can help a Service Provider to determine whether its customers are satisfied. By measuring and monitoring the web QoE score for each client, Service Providers can take actions accordingly to improve the satisfaction of their customers.

Figure 1:
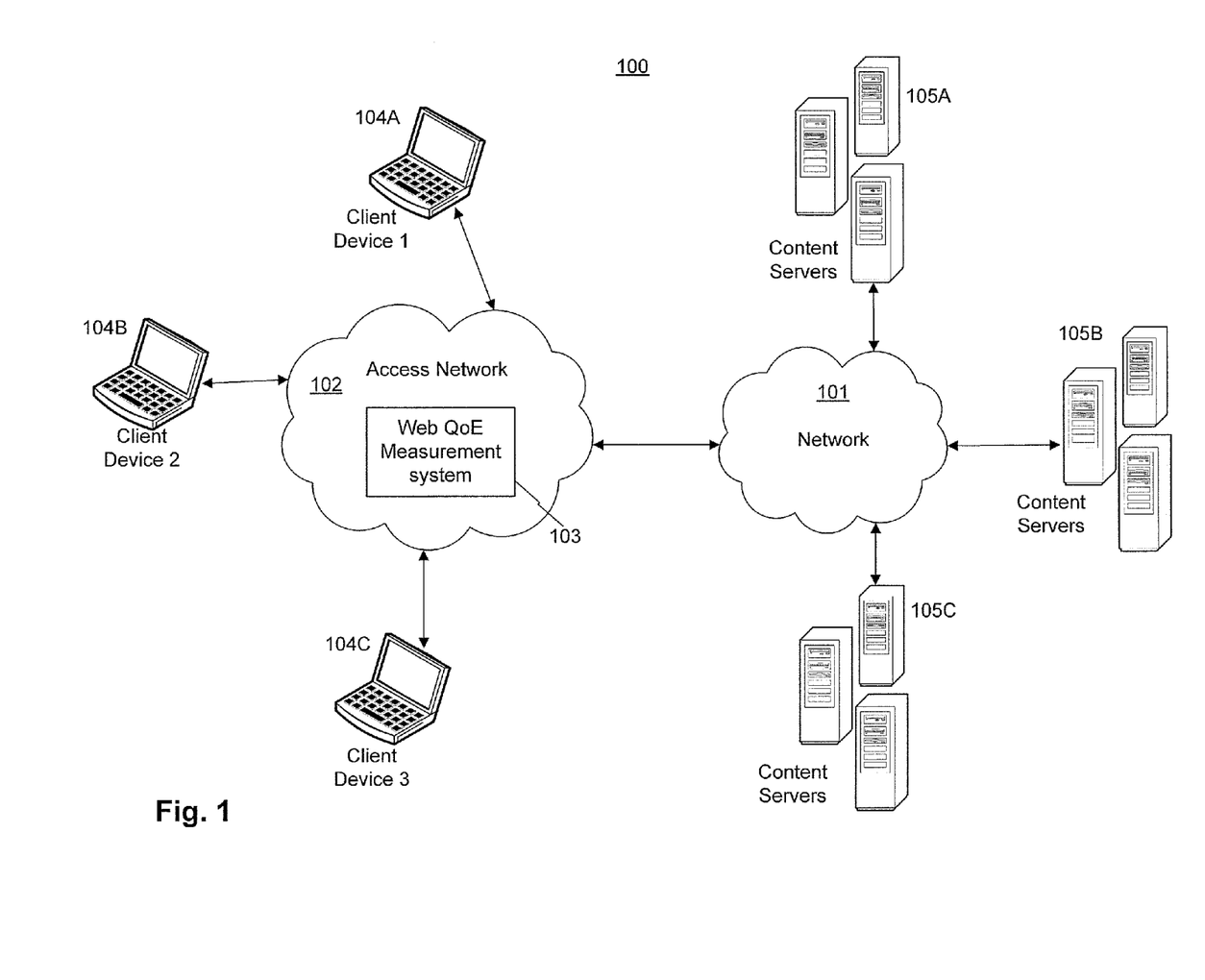
FIG. 1 is a block diagram of an exemplary network system.

FIG. 1 is a block diagram of an exemplary network system. Exemplary network system 100 can be any type of system that transmits data packets over a network. For example, the exemplary system 100 can include one or more networks transmitting data packets across wired or wireless networks from servers to clients. The exemplary system 100 can include, among other things, network 101, access network 102, web QoE measurement system 103, one or more client devices 104(A-C), and one or more content servers 105(A-C).

Network 101 can include any combination of wide area networks (WANs), local area networks (LANs), or wireless networks suitable for packet-type communications. In some exemplary embodiments, network 101 can be, for example, Internet and X.25 networks. Network 101 can communicate data packet with access network 102 and with one or more content servers 105.

Access network 102 can be any combination of radio network, wide area networks (WANs), local area networks (LANs), or wireless networks suitable for packet type communications. Access network 102 can be operated by, for example, service providers such as DSL service provides (e.g., AT&T®), broadband service providers (e.g., Comcast®), and numerous cellular service provides (e.g., AT&T®, Sprint®, and Verizon®). Access network 102 can employ technologies including digital subscriber line (DSL), cable broadband, 802.11 Wi-Fi, Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). For example, in some embodiments, access network 102 can be a General Packet Radio Service (GPRS) core network, which provides mobility management, session management and transport for Internet Protocol packet services in GSM and W-CDMA networks. One or more clients (e.g., 104A-104C) can communicate with the access network 102, which in turn communicates with content servers 105 directly or indirectly through network 101. The exemplary access network 102 can include, among other things, web QoE measurement system 103.

As shown in FIG. 1, web QoE measurement system 103 can be deployed at one or more locations within access network 102. Web QoE measurement system 103, however, is not limited to be located within the access network 102. Rather, it can be implemented at any intermediate nodes within the communication system 100. In some embodiments of access network 102, web QoE measurement system 103 can be located at a gateway node (not shown in FIG. 1) that has visibility into data traffic between all clients and Internet content servers. For example, in the case of a mobile broadband access network using GSM or UMTS technology, web QoE measurement system 103 can be located at any intermediate nodes including Traffic Optimization Platforms (TOP), Deep Packet Inspection (DPI) nodes, and other gateway nodes such as the Gateway GPRS Support Node (GGSN). A Traffic Optimization Platform (TOP) can perform web and video compression. A Deep Packet Inspection (DPI) node can examine the header (and possibly also the data part) of a packet as it passes an inspection point, searching for protocol non-compliance, viruses, spam, intrusions, or defined criteria to decide whether the packet may pass or if it needs to be routed to a different destination, or, for the purpose of collecting statistical information. A Gateway GPRS Support Node (GGSN) can be responsible for the interworking between the GPRS network and external packet switched networks, such as the Internet and X.25 networks.

As discussed above, web QoE measurement system 103 are not limited to be located at these exemplary nodes. Web QoE measurement system 103 can also be implemented on any gateway nodes that convert formatted data provided in one type of network to a particular format required for another type of network, or any other intermediate nodes if desired. A gateway node, for example, may be a server, a router, a firewall server, a host, or a proxy server. Much like a content server, an HTTP proxy server can accept target URLs within a client's browser window, process the request, and then display the contents of the requested URLs immediately back within the client's browser. In some embodiments, the HTTP proxy servers can be explicit HTTP proxy servers (e.g. Wireless Application Protocol (WAP) Gateways) that process web pages or transparent HTTP proxy servers such as those in traffic management and optimization platforms. A gateway node may be capable of processing webpage, image, audio, video, and T.120 transmissions alone or in any combination, and is capable of full duplex media translations.

Web QoE measurement system 103 can process any packet type communications including HTTP transactions. HTTP transactions can include HTTP requests from client devices 104 and HTTP responses from content servers 105.

Client devices 104 can be devices or applications, either in hardware or software, that communicate with access network 102. Client devices 104 can be, for example, a mobile handheld device, a laptop computer, a netbook device, a smart phone device, a web TV equipment, or any other devices or applications that can communicate with a network. Client devices 104 can make requests to and receive responses from content servers 105 through access network 102 and network 101.

Content servers 105 can be any computer systems or software programs that are capable of serving the requests of clients, e.g., client devices 104. Content servers 105 can be any types of servers including content servers, application servers, communication servers, database servers, proxy servers, web servers, caching servers and any other suitable servers. A web page can be located at one content server, or a web page can be located at multiple content servers. For example, a single web page such as a CNN web page can have many objects such as new links, images, videos, etc. The objects may not be located at one content server and can spread onto several content servers for the purpose of reducing server load, or for the purpose of using third party advertisements. Content servers 105 can communicate with client devices 104 through network 101 and access network 102.

Figure 2:
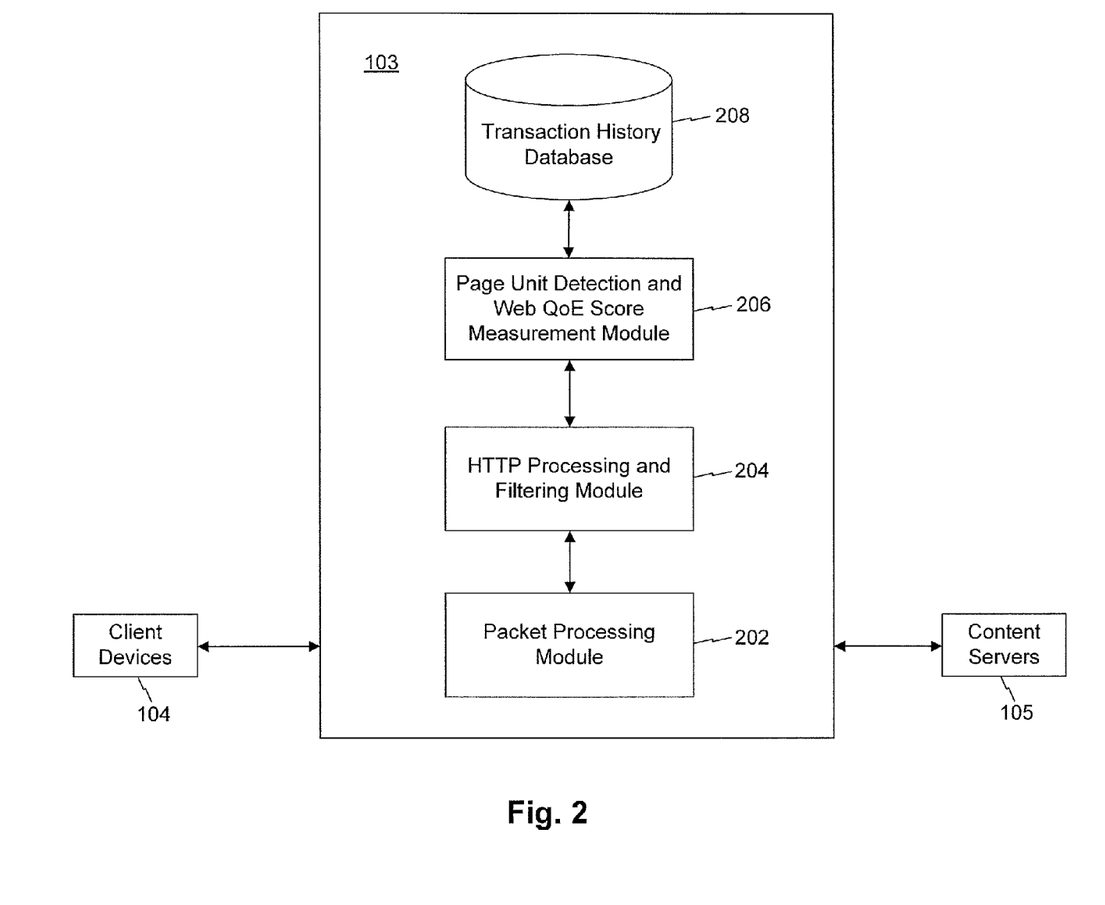
FIG. 2 is a block diagram illustrating an embodiment of an exemplary web QoE score measurement system shown in FIG. 1.

FIG. 2 is a block diagram illustrating an embodiment of an exemplary web QoE measurement system 103 shown in FIG. 1. Web QoE measurement system 103 can include, among other things, a packet processing module 202, an HTTP processing and filtering module 204, a page unit detection and web QoE score measurement module 206, and a transaction history database 208. Web QoE measurement system 103 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Web QoE measurement system 103 can communicate with one or more clients (e.g., client devices 104) and content servers 105, either directly or indirectly. In some embodiments, web QoE measurement system 103 can be part of an adaptive traffic manager, for example, the adaptive traffic manager described in application Ser. No. 13/436,658 titled "Adaptive Traffic Management in Cellular Wireless Networks." Packet processing module 202 is a lower stack in the processing stack of web QoE measurement system 103. Packet processing module 202 is responsible for routing traffic and handling packets between client devices 104 and content servers 105. Packet processing module 202 can be a software program and/or a hardware device.

HTTP processing and filtering module 204 can parse HTTP requests and response headers received from packet processing module 202. The Hypertext Transfer Protocol (HTTP) is an application protocol for distributed, collaborative, hypermedia information systems. HTTP is the fundamental protocol of data communication for the World Wide Web. HTTP functions as a request-response protocol in a client-server computing model. In an HTTP transaction, a web browser, for example, acts as a client (e.g., client devices 104), while an application running on a computer hosting a web site functions as a server (e.g., content servers 105). The client submits an HTTP request message to the server. The server, which stores content, or provides resources, such as HyperText Markup Language (HTML) files, or performs other functions on behalf of the client, returns a response message to the client. A response from the server contains completion status information about the request and may also contain any content requested by the client in its message body. Both HTTP requests and HTTP responses are part of an HTTP transaction. It would be readily appreciated that the processing and filtering performed by HTTP processing and filtering module 204 can be performed by separate modules.

Both the client request and the server response can contain headers. A header defines the operating parameters (i.e., meta-data) of an HTTP transaction. For example, the header may include meta-data indicating whether an HTTP transaction is associated with web page rendering. A header may also include other meta-data describing web pages contents.

HTTP processing and filtering module 204 can be a software program, a hardware device, or any combination thereof for examining the meta-data associated with the transaction and filters out transactions that are unlikely to be associated with web page rendering. In some embodiments, HTTP filtering can be performed because not all the HTTP transactions are associated with web page rendering. For example, the increasing use of sophisticated web technologies generates a constant "chatter" of background traffic between clients and servers. But much of the background "chatter" traffic, which is not associated with web page rendering, is nevertheless based on HTTP.

Filtering can be based on meta-data associated with each HTTP transaction at the HTTP proxy servers. The meta-data can include the user agent of the HTTP protocol, the Multipurpose Internet Mail Extensions (MIME) type of the content from the server, and any other information about the contents in the HTTP transaction. A user agent is an application, such as a software application, on the client in the HTTP protocol within a client-server system. Using a user agent meta-data, the HTTP protocol can identify the application that originated the request at the client. Thus, the user agent meta-data can be used to determine whether an HTTP transaction is associated with web page rendering.

The Multipurpose Internet Mail Extensions (MIME) is another type of meta-data. MIME can describe the content type of the transaction including, for example, text, attachment, HTML, image, audio, video, and applications. Some of the contents described in MIME content type meta-data are associated with web page rendering, but some are not. For example, the content with a content type of HyperText Markup Language (HTML) language may be associated with web page rendering if the HTML contents are from web pages. Thus, MIME can also be used to determine whether an HTTP transaction is associated with web page rendering.

Page unit detection and web QoE score measurement module 206 processes, in real-time, the filtered HTTP transactions corresponding to web page rendering. It would be readily appreciated that the detecting of page units and the measuring of web QoE scores performed by page unit detection and web QoE score measurement module 206 can be performed by separate modules. In some embodiments, the processing can include detecting of page unit boundaries, measuring of web QoE score and storing the web QoE score in a transaction history database 208. In order to measure the time taken to download a complete web page so that a web QoE score can be measured, HTTP transactions are be grouped into web pages. At the intermediate node, such as at a gateway node, however, each HTTP transaction is treated as an independent unit and the number of transactions that belong to the same web page may vary significantly. For example, downloading a Google® search web page with a simple search box may involve only a few HTTP transactions. But downloading a CNN® web page containing hundreds of news links, images, advertisements, and video clips may involve a significantly larger number of HTTP transactions.

Because the number of HTTP transactions varies from one web page to another, it is difficult for an intermediate node to identify exactly the group of transactions that belong to the same page. Hence, it may not be practical to delineate web page boundaries at the intermediate nodes in order to measure the time taken to download a complete web page. Moreover, new web technologies such as Asynchronous JavaScript and XML (AJAX) make it more difficult to detect page boundaries due to the constant "chatter" of background transactions between client and server.

Because of the difficulty to delineate web page boundaries as discussed above, web QoE measurement system 103 can instead use page units. A page unit can be a collection of HTTP transactions from a client device that occur closely in time. Web QoE measurement system 103 can distinguish client devices based on the source IP addresses of a request for web content or the destination IP address of a response to the request. Web QoE measurement system 103 can also distinguish client devices based on information included in, for example, special HTTP headers (e.g., x-forwarded-for), RADIUS feeds, PCRF servers and Subscriber Profile Repositories. Web QoE measurement system 103 can use a small timing threshold for attempting to limit the transactions for a single web page. This timing threshold is a predetermined number that is correlated with downloading a single web page. While the page unit is a tool used to help determine the amount of time to download a single web page, the page unit can include some transactions that are directed to one or more web pages so long as those transactions occur within this timing threshold. Although a page unit may not correspond to a single web page in all circumstances, the time taken to download the page unit is correlated to the time taken to download a web page. Therefore, page units can be used as an alternative to measure the web QoE score for web page rendering.

Besides being based on the timing threshold and the transactions being from the client device, in some embodiments, the page unit can be defined based on other properties. A page unit can also require that user agent information contained in meta-data in the HTTP transactions (e.g. client HTTP requests) be the same. A user agent is an application, such as a software application, on the client device using the HTTP protocol within a client-server system. Using the user agent meta-data, the HTTP protocol can identify the application that originated the request at the client. Thus, user agent meta-data can indicate whether the HTTP transactions are from the same application of the client. Using the user agent information would allow the web QoE measurement system to distinguish a transaction originating from an e-mail application (Microsoft Outlook™) from transactions originating from a web browser (Microsoft Internet Explorer™).

In some embodiments, the page unit can also be defined based in part on whether one of the HTTP transactions includes at least one HyperText Markup Language (HTML) object. HTML elements are the basic building-blocks of web pages and thus HTML object can be associated with web page rendering. In some embodiments, the page unit can be defined based in part on whether the size of the largest HTML object satisfies a threshold condition. In some embodiments, page unit detection and web QoE score measurement module 206 can determine whether the size of the largest HTML object is greater than a pre-configured threshold value. For example, a size threshold value can be set at 2 KB and the page unit detection and web QoE score measurement module 206 can reject the transaction set as a page unit if the largest HTML object in the transaction set is less than 2 KB. Similarly, in some embodiments, a page unit can be defined based in part on whether the number of image objects in the HTTP transaction satisfies a threshold condition. In these embodiments, page unit detection and web QoE score measurement module 206 can determine whether the number of image objects is greater than a pre-configured threshold value. For example, an image threshold value can be set to be 2 images and the page unit detection and web QoE score measurement module 206 can reject the transaction set as a page unit if the number of images in the transaction set is less than 2.

As indicated above, page unit detection and web QoE score measurement module 206 can also define a page unit based on the timing threshold. For example, to determine whether transaction correspond with a page unit, web QoE measurement system 103 can monitor a time gap between any two consecutive transactions fall within the timing threshold condition for determining whether the second transaction of those two consecutive transactions is part of the page unit. For example, page unit detection and web QoE score measurement module 206 can require that the time gap be less than a pre-configured threshold value. A time gap can be defined as the time period from the completion of a first HTTP transaction to the beginning of a second HTTP transaction. A time gap can be greater than zero if the two consecutive transactions do not overlap, or equal to zero if the two consecutive transactions overlap or if the duration of one transaction is completely subsumed by the duration of other transaction. In some embodiments, the properties for defining a page unit can include properties not referred to above. Similarly, a page unit does not have to require all the HTTP transaction properties and can require any combination of the HTTP transaction properties as described above.

The time taken to download a page unit can be correlated to the time taken to download a web page. In some embodiments, the time taken to download a page unit, i.e. page unit time, can be defined as the time period from the beginning of the first HTTP transaction in the page unit to the completion of the last HTTP transaction in the page unit. In some embodiments, a page unit has HTTP transactions that are similar to those in a web page. The objects in HTTP transactions in a page unit can include, for example, HTML objects, images, Java Scripts, and Cascading Style Sheets (CSS). All the objects in a page unit can be found in a web page. Thus, measurement of the page unit time can be used in place of the measurement of time taken to download a web page.

Using the page unit and the page unit time information, page unit detection and web QoE score measurement module 206 can generate a QoE score for that page unit. The page unit time, however, can differ according to the number of objects in the HTTP transactions in the page unit. In some embodiments, the page unit time can increase as the number of objects in the HTTP transactions in the page unit increases. In some embodiments, however, the page unit time may not increase linearly as the number of objects in the page unit increases. For example, the page unit time can increase at a faster rate when the number of objects is small, but increase at a slower rate when the number of objects becomes large. In other words, the page unit time may exhibit a non-linear relationship with the number of objects in the HTTP transactions in the page unit. This non-linear relationship can be a result of the web browser's tendency to download multiple objects in a parallel way. When multiple objects are downloaded in parallel, a growing number of objects may not necessarily result in a rapid increase of time taken to download a page unit (i.e., page unit time).

A non-linear relationship between the page unit time and the number of objects can lead to inaccurate measurements of web QoE score. For example, within a page unit time $t_1$, a first client may have completed downloading a large number of objects that belong to a complex web page. In a page unit time $t_2$, a second client may have completed downloading a small number of objects that belong to a simple web page. Even if the page unit time $t_1$ is greater than page unit time $t_2$, the increased page unit time $t_1$ may not necessarily indicate that the first client had a bad web QoE score compared to the second client.

The page unit time can be normalized to account for the non-linear relationship between the page unit time and number of objects in HTTP transactions in a page unit. In some embodiments, the normalized page unit time can be obtained based on the measured page unit time and the average page unit time for the same number of objects. For example, the normalized page unit time can be obtained by multiplying an average page unit time for a fixed number of objects to a ratio of page unit time for a measured number of objects and an average page unit time for the same measured number of objects, i.e., normalized page unit time=average page unit time for a fixed number of objects×((page unit time for a measured number of objects)/(average page unit time for the same measured number of objects)). The page unit time for a measured number of objects can be the measurements related to a specific client. The average page unit time for a fixed number of objects and the average page unit time for the same measured number of objects can be measurements across all clients and can be pre-determined and stored in a database (e.g., database 208 shown in FIG. 2).

The fixed number in the above formula can be any number that is pre-determined. For example, the fixed number can be 25. The average page unit time for a fixed number of objects and the average page unit time for the same measured number of objects can be obtained based on measurements across all clients in a pre-determined time period. For example, if the fixed number is 25, measurements of page unit times can be obtained for 25 objects across all clients. The average page unit time for a fixed number of objects (i.e., 25 objects in this example) can then be acquired by taking the average of the measurements of page unit times for the 25 objects across all the clients. Also, if the measured number of objects (i.e., the number of objects included in a page unit for a specific client) is, for example, 50, measurements of page unit times can be obtained for same number of objects (i.e. 50 objects in this example) across all clients. The average page unit time for the same measured number of objects can then be acquired by taking the average of the measurements of page unit times for the 50 objects across all the clients. Thus, if the page unit time for a measured number of objects is greater than the average page unit time for the same measured number of objects, the ratio of the two would be greater than "1." And thus the normalized page unit time for this client is greater than the average page unit time for a fixed number of objects (e.g. 25 objects) across all clients. Hence, in this example, the client may have had a worse than average web QoE score because the page unit time of the current HTTP transactions associated with the client is higher than average.

In some embodiments, the pre-determined time period in the measuring of the average page unit time for a fixed number of objects and the average page unit time for the same measured number of objects can be based on a sliding time window. The sliding time window can be spanning the most recent three hours. For example, if measurement starts at 9 AM, the sliding time window can be from 9 AM-12 PM, 10 AM-1 PM, 11 AM-2 PM, so on and so forth. In some embodiments, the sliding window can be more than three hours (such as a day, or several days).

The normalized page unit time can be used to measure the web Quality of Experience (web QoE) score of a client rendering of web pages. In some embodiments, the web QoE score can be "0" if the normalized page unit time is greater or equal to a threshold value. In contrast, the web QoE score can be "1" if the normalized page unit time is less than a threshold value. The threshold value determines if the quality of client's web rendering is good or bad and can be configured to any desirable value. It is easily appreciated by those skilled in the art that the web QoE scores may not be limited to 0 and 1. Rather, the web QoE scores can be any values and can be defined by multiple ranges for the normalized page unit time instead of using a single threshold value. Page unit detection and web QoE measurement module 206 can be a software program and/or a hardware device.

Transaction history database 208 can store web QoE scores determined by page unit detection and web QoE measurement module 206. Transaction history database 208 can also store normalized page unit time, non-normalized average page unit time and any other transaction history data for each client. The non-normalized average page unit time can be for different number of HTTP objects, for example, 25 or 100 HTTP objects. The non-normalized average page unit time can be obtained by computing an average page unit time based on measurements across all clients in a pre-determined time period (e.g., a most recent sliding time window). Transaction history database 208 can be a software program and/or a hardware device and can be located local to or remote from web QoE measurement system 103.

Figure 3:
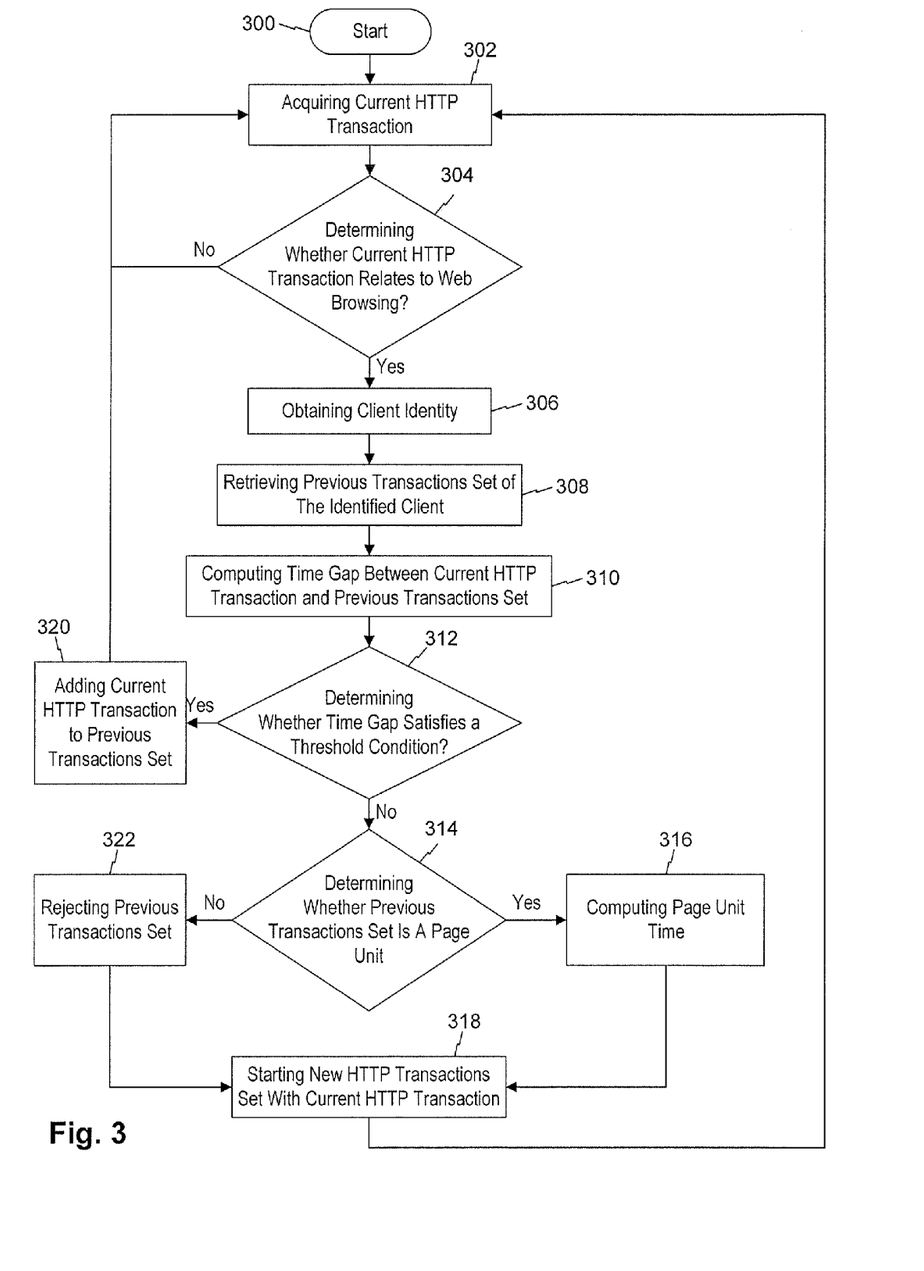
FIG. 3 is a flowchart representing an exemplary method of page unit time measurement.

FIG. 3 is a flowchart representing an exemplary method of page unit time measurement. Referring to FIG. 3, it will be readily appreciated by one of ordinary skill in the art that the illustrated procedure can be altered to delete steps or further include additional steps. The exemplary method of web QoE score measurement can be based on detection of page unit boundaries by a page unit Detection Module (e.g., page unit Detection and web QoE Score Measurement Module 206).

After initial step 300, a web QoE score measurement system acquires (302) an HTTP transaction from client devices (e.g., client devices 104). The HTTP transaction can include any type of objects associated with a web page, such as plain text, HTML, image, audio, video, CSS, etc.

After the HTTP transaction is acquired, the web QoE score measurement system (e.g., web QoE score measurement system 103) determines (304) whether the HTTP transaction is accepted or filtered out. For example, an HTTP filtering module (e.g., HTTP Processing and Filtering Module 204) filters the HTTP transaction to determine whether an HTTP transaction is not related to web browsing.

If the HTTP transactions are determined to be accepted by the HTTP filtering module, the web QoE score measurement system obtains (306) the client identify. The client identity can be obtained from, for example, the source IP address of the client from an HTTP request. The client identity can also be obtained from a destination IP address in the HTTP response from a content server. The client identity can also be obtained from information included in, for example, special HTTP headers (x-forwarded-for), RADIUS feeds, PCRF servers and Subscriber Profile Repositories. By obtaining the client identity, the web QoE measurement system associates the current HTTP transaction with an individual client. The web QoE measurement system can store this association in a database (e.g., transaction history database 208).

The web QoE score measurement system then retrieves (308) previous transactions set of the client device. The previous transactions set can be retrieved from a transaction history database (e.g. transaction history database 208). Subsequently, the web QoE score measurement system computes (310) the time gap between the retrieved previous transactions set and the current HTTP transaction. For example, the time gap can be computed based on the completion time of the last HTTP transaction in the previous transaction set and the beginning time of the current HTTP transaction.

Once the time gap is computed, the web QoE score measurement system determines (312) whether the time gap between current HTTP transaction and previous transactions set satisfy a threshold condition. In some embodiments, the web QoE score measurement system can sequentially process HTTP transactions from a client and search for time gaps that are larger than a preselected threshold value. For example, a time gap that is greater than a threshold value can be an indicator that the last transaction of the previous transactions set was the outer boundary of a page unit. The threshold condition can be, for example, a threshold value that is pre-configured to any desirable values, such as values based on the historical measurements or past experiences. This threshold value can also be tunable.

If the time gap between the current HTTP transaction and previous transactions set does satisfy a threshold condition at determination step 312, the web QoE score measurement system adds (320) current HTTP transaction to the previous transaction set and goes back to step 302 to acquire additional HTTP transaction. Adding the current HTTP transaction to the previous transactions set indicates that the current HTTP transaction and the previous transactions are transactions of a page unit.

On the other hand, if the time gap between the current HTTP transaction and previous transactions set does not satisfy a threshold condition, the web QoE score measurement system proceeds to determine (314) whether the previous transactions set is a page unit. The determination can be based on several HTTP transaction properties such as number of HTML objects, size of the HTML object, number of images, total number of objects, and total download time for the current HTTP transactions. In some embodiments, determination steps 312 and 314 shown can be performed by a page unit detection and web QoE score measurement module (e.g., page unit detection and web QoE score measurement module 206).

If the previous transactions set is determined to be a page unit, the web QoE score measurement system computes (316) the page unit time of the page unit. This page unit time can be used for computing a QoE score for a client. The web QoE score measurement system then starts (318) a new HTTP transactions set with the current HTTP transactions and goes back to step 302 to retrieve additional HTTP transactions.

If the previous transaction set is determined to not be a page unit, the web QoE score measurement system rejects (322) the previous transaction set as a page unit without obtaining any page unit time. The web QoE score measurement system then also starts (318) new HTTP transactions set with the current HTTP transaction.

It is easily appreciated by those skilled in the art that if no previous HTTP transactions set is available, step 310 to step 316 can be skipped and the web QoE score measurement system proceed to step 318 to start a new transactions set with the current HTTP transaction. It is also easily appreciated by those skilled in the art that additional steps can be included anywhere in the flowchart shown in FIG. 3 to enhance the decision flow.

Figure 4:
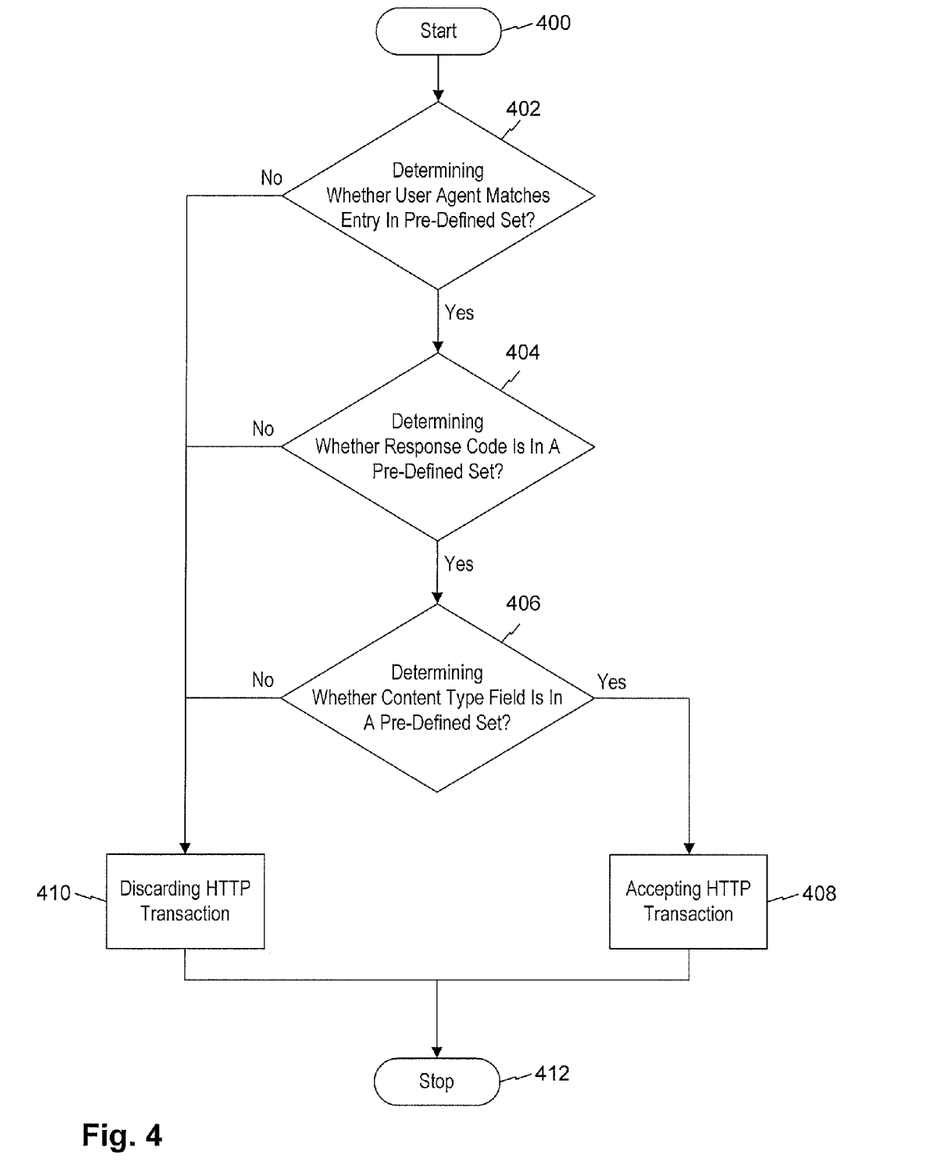
FIG. 4 is a flowchart representing an exemplary method for determining whether an HTTP transaction relates to web browsing, as shown in FIG. 3.

FIG. 4 is a flowchart representing an exemplary method for determining whether an HTTP transaction relates to web browsing (such as in determination step 304 of FIG. 3). Referring to FIG. 4, it will be readily appreciated by one of ordinary skill in the art that the illustrated procedure can be altered to delete steps or further include additional steps. After initial step 400, a web QoE score measurement system (e.g., web QoE score measurement system 103) determines (402) whether a user agent of an HTTP transaction matches an entry in a predefined set. A user agent is an application, such as a software application, on the client in the HTTP protocol within a client-server system. An identification of the user agent could be provided as a string in the HTTP request. Using this user agent meta-data, the HTTP protocol can identify the application that originated the request at the client. The entries in the predefined set can be, for example, a known list of popular web browsers such as Microsoft® Internet Explorer, Mozilla® Firefox, Google® Chrome, and Apple® Safari. The matching can be done based on regular expression patterns, substring matching, matching full strings or any other matching mechanisms. On the other hand, for example, a user agent not involved with web browsing could be AndroidDownloadManager.

If the user agent of the HTTP transaction matches an entry in the predefined set, the web QoE score measurement system could then determine (404) whether a response code is in a predefined set. A response code indicates the status of an HTTP transaction such as a successful HTTP transaction, an HTTP redirection, a server error, etc. The predefined set can be configured to include response codes that are associated with web page rendering. For example, the web QoE score measurement system can accept only HTTP transactions with response codes of 200 (successful HTTP transaction) or 301/302 (HTTP redirection), but filter out HTTP transactions associated with other response codes.

If the response code of the current HTTP transaction is determined to be within the predefined set, the web QoE score measurement system could then determine (406) whether a content type field of the current HTTP transaction is in a predefined set. Content type of HTTP transactions can be, for example, markup language, images, Java script, etc. In an HTTP transaction (e.g., an HTTP response), content type fields corresponding to the content type are included in the response meta-data. An exemplary list of content type fields associated with web pages is shown in Table 1. For example, a content type field contained within an HTTP response may indicate the content as "text/html," "application/xhtml+xml," or "image." The content type field in the current HTTP transaction can be matched with respect to a predefined content type list to determine whether the current HTTP transaction is associated with a web page. The matching can also be done based on regular expression patterns, substring matching, matching full strings or any other matching mechanisms. The content type can also be obtained from, for example, portion of an HTTP payload content.

TABLE 1

An exemplary list of content type fields associated with web pages.

| Content Type | Content Type Field |
| --- | --- |
| Markup language | text/html, application/xhtml+xml |
| Image | image/* |
| Java Script | text/javascript, application/x-javascript |
| Style Sheet | text/css |
| Shockwave Flash | application/x-shockwave-flash |

If the content type field of the current HTTP transaction is determined to be in a predefined set, the web QoE score measurement system accepts (408) the current HTTP transaction. If the user agent of the HTTP transaction does not match (402) an entry in the predefined set, or if the response code of the current HTTP transaction is determined (404) to not be within the predefined set, or if the content type field of the current HTTP transaction is determined (406) to not be in the predefined set, the web QoE score measurement system discards (410) the current HTTP transaction because it determines that the HTTP transaction is not associated with a web page. After having either accepted (408) or discarded (410) the current HTTP transaction, the method can proceed to end (412).

Moreover, it will be readily appreciated that the order of determination steps 402, 404, and 406 can be rearranged.

Figure 5:
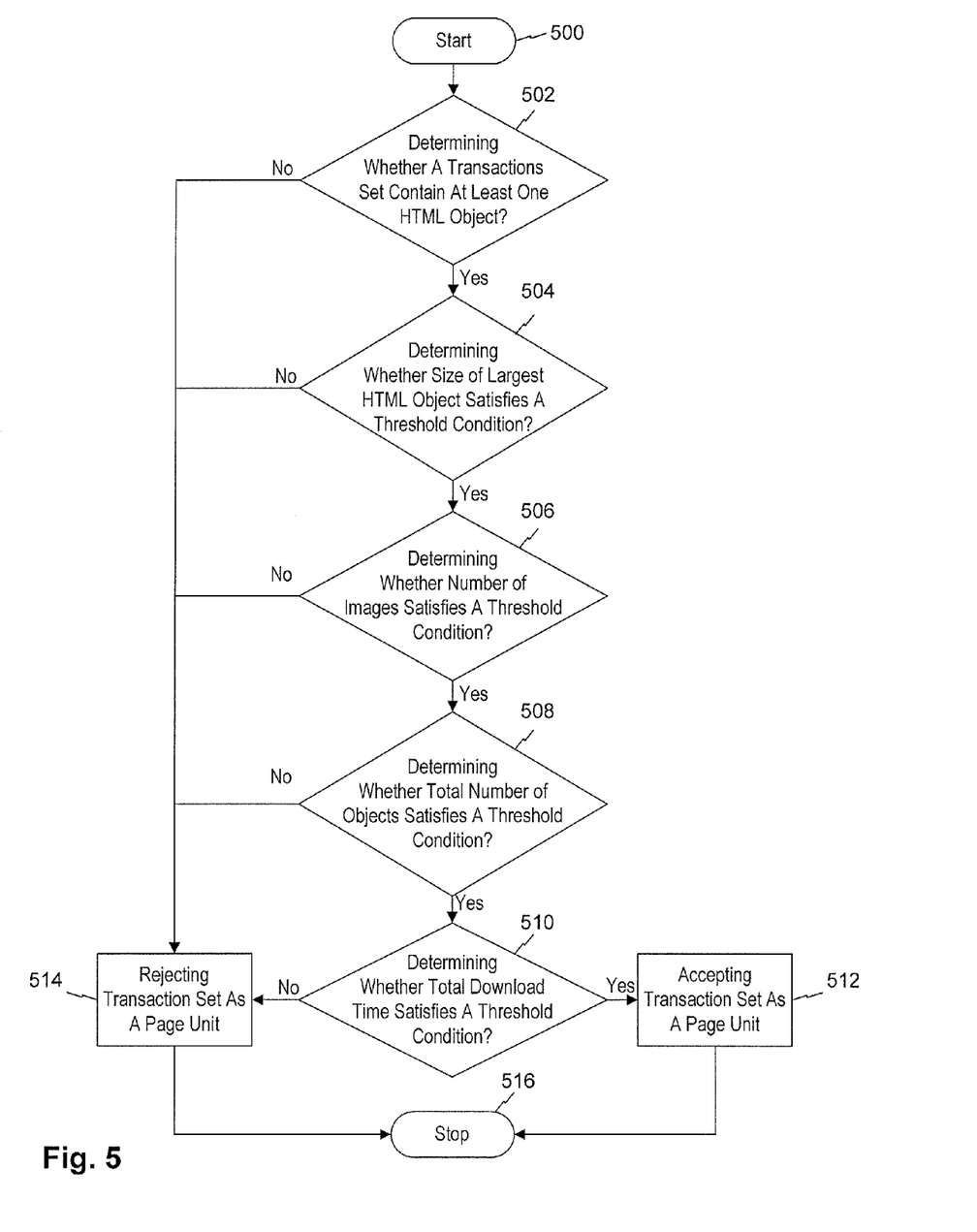
FIG. 5 is a flowchart representing an exemplary method for determining whether a transaction set is a page unit, as shown in FIG. 3.

FIG. 5 is a flowchart representing an exemplary method for determining whether a transaction set is a page unit (e.g., such as the determination step 314 in FIG. 3). Referring to FIG. 5, it will be readily appreciated by one of ordinary skill in the art that the illustrated procedure can be altered to delete steps or further include additional steps. The exemplary method for determining whether a transaction set is a page unit can be a heuristic method for accepting or rejecting page units. Page units can be rejected if there is evidence that a transaction set may not correspond to a web page. After initial step 500, a web QoE score measurement system (e.g., web QoE score measurement system 103) determines (502) whether a transaction set, which includes one or more HTTP transactions, includes at least one HTML object. Having an HTML object within a transaction set likely indicates that the transaction set is associated with a web page. Likewise, a transaction set without an HTML object likely indicates that the transaction set is not associated with a web page.

If the transaction set has at least one HTML object, the web QoE score measurement system proceeds to determine (504) whether the size of the largest HTML object satisfies a threshold condition. In some embodiments, a page unit must have the size of at least one HTML object greater than a pre-configured threshold value. The requirement for a minimum HTML object size can filter out spurious HTTP transactions that are marked as HTML but are too small to be associated with a web page. The threshold condition can be, for example, a tunable, preconfigured threshold value that, for example, can be based on the historical measurements or past experiences.

If the size of the largest HTML object satisfies the threshold condition (i.e., the size of at least one HTML object is greater than a pre-configured threshold value), the web QoE score measurement system proceeds to determine (506) whether the number of images in the transactions set satisfies a threshold condition. In some embodiments, some of the web pages requested by clients have images. The web QoE score measurement system can require the number of images in the transactions set to satisfy the threshold condition. For example, in order for the transactions set to be considered a page unit, a transactions set can be required to have a number of images greater than or equal to a threshold value. The threshold condition can be, for example, a tunable, preconfigured threshold value that, for example, can be based on historical measurements or past experiences.

If the number of images satisfies the threshold condition (i.e., the number of images in a transactions set is greater than or equal to a threshold value), the web QoE score measurement system proceeds to determine (508) whether the total number of objects in the transaction sets satisfies a threshold condition. Web pages have a finite number of objects. In some embodiments, a transactions set can be rejected as a page unit if the number of objects or HTTP transactions does not satisfy a threshold condition. For example, a transactions set having a total number of objects greater than a pre-configured threshold value can be rejected as a page unit. The threshold condition can be, for example, a tunable, preconfigured threshold value that, for example, can be based on the historical measurements or past experiences.

If the total number of objects satisfies the threshold condition (i.e., a transactions set having a total number of objects less than or equal to a pre-configured threshold value), the web QoE score measurement system proceeds to determine (510) whether the total download time satisfies a threshold condition. In some embodiments, step 510 can remove outliers that have a large download time from being considered a page unit. For example, the total time duration of transaction set (i.e. time period measured from the start of the first HTTP transaction to the end of last HTTP transaction) is compared with a threshold condition. If the total time duration satisfies the threshold condition, for example, less than a threshold value, the transaction set can be accepted as a page unit. The threshold condition can be, for example, a tunable, preconfigured threshold value that, for example, can be based on the historical measurements or past experiences.

If the total download time satisfies the threshold condition (i.e., the download time is less than the download-time threshold time), the web QoE score measurement system proceeds to accept (512) the transaction set as a page unit. If the transaction set contains (502) no HTML object, or if the size of the largest HTML object does not satisfy (504) the size threshold condition, or if the number of images in the transaction set does not satisfy (506) the transaction-number threshold condition, or if the total number of objects does not satisfy (508) the object-number threshold condition, or if the total download time does not satisfy (510) the download-time threshold condition, the web QoE score measurement system rejects (514) the transaction set as a page unit. After having either accepted (512) or rejected (514) the transaction set as a page unit, the method can proceed to end 516.

It will readily appreciated by those skilled in the art that any of determination steps 504, 506, 508, and 510 can be rearranged or deleted from FIG. 5 without departing from the embodiments described herein.

In some embodiments, several enhancements can be included for detection of the start of a new page unit. One exemplary enhancement is to treat an HTTP transaction with content type field of "text/html" as potential indicators of a start of a new page unit. Content type fields are meta-data contained in the HTTP transactions that can be used to identify what type of content is included in the HTTP transaction. In another exemplary embodiment, if a previous transaction set is acceptable as a page unit (i.e. it passes all the steps shown in FIG. 5) and the size of the HTML content of the current HTTP transaction is greater than a threshold, the current HTTP transaction can be treated as the start of a new page unit.

In some embodiments, enhancement can be based on a total page unit time of a hypothetical page unit comprising the current HTTP transaction and the previous transaction set. In other words, the total page unit time can be computed by adding the current HTTP transaction to the previous transaction set regardless whether the current HTTP transaction and previous transaction set is actually a page unit. If the total page unit time exceeds a predefined threshold, then the current HTTP transaction can be treated as the start of a new page unit.

In some embodiments, enhancement can be based on the number of HTTP transactions in the previously transaction set. If the number of HTTP transactions has reached a predefined threshold, the current HTTP transaction can be treated as the start of a new page unit. This enhancement can, for example, prevent the grouping of a large set of HTTP transactions which are closely spaced, i.e., which have small time gaps, from being wrongfully rejected in step 508 (i.e., rejection of a page unit because of total number of objects exceeding a threshold value) shown in FIG. 5.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A method comprising:
    acquiring a current Hypertext Transfer Protocol (HTTP) transaction;
    determining whether the current HTTP transaction relates to web browsing;
    acquiring a previous transactions set of a specific client;
    evaluating whether the current HTTP transaction belongs with the previous transactions set;
    if the current HTTP transaction belongs with the previous transactions set, adding the current HTTP transaction to the previous transactions set; and
    if the current HTTP transaction does not belong with the previous transactions set, creating a boundary of a page unit that includes the HTTP transactions of the previous transactions set for computing a page unit time.

2. The method of claim 1, wherein the page unit time is used for acquiring an expected quality of experience score.

3. The method of claim 1, wherein the determining whether the current HTTP transaction relates to web browsing comprises:
    determining whether a user agent of the current HTTP transaction matches with an entry in a predefined user agent set; and
    accepting the current HTTP transaction if the user agent of the current HTTP transaction matches with an entry in a predefined user agent set.

4. The method of claim 1, wherein the determining whether the current HTTP transaction relates to web browsing comprises:
    determining whether a response code is in a predefined response code set, wherein the response code is acquired based on the current HTTP transaction; and
    accepting the current HTTP transaction if the response code is determined to be within the predefined response code set.

5. The method of claim 1, wherein the determining whether the current HTTP transaction relates to web browsing comprises:
    determining whether a content type is within a predefined content type set, wherein the content type is acquired based on the current HTTP transaction; and accepting the current HTTP transaction if the content type is within a predefined content type set.

6. The method of claim 1, wherein the evaluating whether the current HTTP transaction belongs with the previous transactions set comprises:
   computing a time gap between the current HTTP transaction and the previous transactions set;
   determining whether the time gap satisfies a predefined timing threshold condition; and
   associating the current HTTP transaction with the previous transactions set if the time gap satisfied the predefined timing threshold condition.

7. The method of claim 1, wherein the creating a boundary of a page unit further comprises determining whether the previous transactions set is the page unit.

8. The method of claim 7, wherein determining whether the previous transactions set is a page unit further comprises:
   determining whether the previous transactions set includes at least one HyperText Markup Language (HTML) object; and
   accepting the previous transactions set as a page unit based at least in part on the previous transaction set including at least one HTML object.

9. The method of claim 7, wherein determining whether the previous transactions set is a page unit further comprises:
   determining whether size of a largest HyperText Markup Language (HTML) object included in the previous transactions set satisfies a size threshold condition; and
   accepting the previous transactions set as a page unit based at least in part on the size of the largest HTML object satisfying a size threshold condition.

10. The method of claim 7, wherein determining whether the previous transaction set is a page unit further comprises:
    determining whether a number of images included in the previous transactions set satisfies an image threshold condition; and
    accepting the previous transactions set as a page unit based at least in part on the number of images satisfying the image threshold condition.

11. The method of claim 7, wherein determining whether the previous transactions set is a page unit further comprises:
    determining whether a total number of objects included in the previous transactions set satisfies a number of object threshold condition; and
    accepting the previous transactions set as a page unit based at least in part on the total number of objects satisfying the number of object threshold condition.

12. The method of claim 7, wherein determining whether the previous transactions set is a page unit further comprises:
    determining whether a total download time satisfies a download time threshold condition; and
    accepting the previous transactions set as a page unit based at least in part on the total download time satisfying the download time threshold condition.

13. The method of claim 1, further comprising:
    acquiring a first average page unit time based on predetermined page unit times of more than one client for a fixed number of objects, wherein the first average page unit time is stored in a database;
    acquiring a second average page unit time based on predetermined page unit times of more than one client for the same number of objects included within the HTTP transactions of the previous transactions set, wherein the second average page unit time is stored in the database; and
    computing a normalized page unit time based on the page unit time, the first average page unit time and the second average page unit time.

14. The method of claim 13, wherein the acquiring the first average page unit time and the acquiring the second average page unit time are based on a sliding time window.

15. A non-transitory computer readable storage medium storing instruction that, when executed by a computer, cause the computer to perform a method for processing Hypertext Transfer Protocol (HTTP) data, the method comprising:
    acquiring a current HTTP transaction;
    determining whether the current HTTP transaction relates to web browsing;
    acquiring a previous transactions set of a specific client;
    evaluating whether the current HTTP transaction belongs with the previous transactions set;
    if the current HTTP transaction belongs with the previous transactions set, adding the current HTTP transaction to the previous transactions set; and
    if the current HTTP transaction does not belong with the previous transactions set, creating a boundary of a page unit that includes the HTTP transactions of the previous transactions set for computing a page unit time.

16. The computer readable storage medium of claim 15, wherein the page unit time is used for acquiring an expected quality of experience score.

17. The computer readable storage medium of claim 15, wherein the determining whether the current HTTP transaction relates to web browsing comprises:
    determining whether a user agent of the current HTTP transaction matches with an entry in a predefined user agent set; and
    accepting the current HTTP transaction if the user agent of the current HTTP transaction matches with an entry in a predefined user agent set.

18. The computer readable storage medium of claim 15, wherein the determining whether the current HTTP transaction relates to web browsing comprises:
    determining whether a response code is in a predefined response code set, wherein the response code is acquired based on the current HTTP transaction; and
    accepting the current HTTP transaction if the response code is determined to be within the predefined response code set.

19. The computer readable storage medium of claim 15, wherein the determining whether the current HTTP transaction relates to web browsing comprises:
    determining whether a content type is within a predefined content type set, wherein the content type is acquired based on the current IMP transaction; and
    accepting the current HTTP transaction if the content type is within a predefined content type set.

20. The computer readable storage medium of claim 15, wherein the evaluating whether the current HTTP transaction belongs with the previous transactions set comprises:
    computing a time gap between the current HTTP transaction and the previous transactions set;
    determining whether the time gap satisfies a predefined timing threshold condition; and
    associating the current HTTP transaction with the previous transactions set if the time gap satisfied the predefined timing threshold condition.

21. The computer readable storage medium of claim 15, wherein the creating a boundary of a page unit further comprises determining whether the previous transactions set is the page unit.

22. The computer readable storage medium of claim 21, wherein determining whether the previous transactions set is a page unit further comprises:
  determining whether the previous transactions set includes at least one HyperText Markup Language (HTML) object; and
  accepting the previous transactions set as a page unit based at least in part on the previous transactions set including at least one HTML object.

23. The computer readable storage medium of claim 21, wherein determining whether the previous transactions set is a page unit further comprises:
  determining whether size of a largest HyperText Markup Language (HTML) object included in the previous transactions set satisfies a size threshold condition; and
  accepting the previous transactions set as a page unit based at least in part on the size of the largest HTML object satisfying a size threshold condition.

24. The computer readable storage medium of claim 21, wherein determining whether the previous transactions set is a page unit further comprises:
  determining whether a number of images included in the previous transactions set satisfies an image threshold condition; and
  accepting the previous transactions set as a page unit based at least in part on the number of images satisfying the image threshold condition.

25. The computer readable storage medium of claim 21, wherein determining whether the previous transactions set is a page unit further comprises;
  determining whether a total number of objects included in the previous transactions set satisfies a number of object threshold condition; and
  accepting the previous transactions set as a page unit based at least in part on the total number of objects satisfying the number of object threshold condition.

26. The computer readable storage medium of claim 21, wherein determining whether the previous transactions set is a page unit further comprises:
  determining whether a total download time satisfies a download time threshold condition; and
  accepting the previous transactions set as a page unit based at least in part on the total download time satisfying the download time threshold condition.

27. The computer readable storage medium of claim 15, further comprising:
  acquiring a first average page unit time based on predetermined page unit times of more than one client for a fixed number of objects, wherein the first average page unit time is stored in a database;
  acquiring a second average page unit time based on predetermined page unit times of more than one client for the same number of objects included within the HTTP transactions of the previous transactions set, wherein the second average page unit time is stored in the database; and
  computing a normalized page unit time based on the page unit time, the first average page unit time and the second average page unit time.

28. The computer readable storage medium of claim 27, wherein the acquiring the first average page unit time and the acquiring the second average page unit time are based on a sliding time window.

29. An apparatus for page unit detection comprising:
  a packet processor configured to acquire a current Hypertext Transfer Protocol (HTTP) transaction;
  a transaction filter configured to determine whether the current HTTP transaction relates to web browsing;
  a page unit detector configured to
    acquire a previous transactions set of a specific client,
    evaluate whether the current HTTP transaction belongs with the previous transactions set,
    if the current HTTP transaction belongs with the previous transactions set, add the current HTTP transaction to the previous transactions set; and
    if the current HTTP transaction does not belong with the previous transactions set, create a boundary of a page unit that includes the HTTP transactions of the previous transactions set for computing a page unit time.

30. The apparatus of claim 29, wherein the page unit time is used for acquiring an expected quality of experience score.

31. The apparatus of claim 29, wherein the transaction filter is configured to determine whether the current HTTP transaction relates to web browsing by determining whether a user agent of the current HTTP transaction matches with an entry in a predefined user agent set, and accepting the current HTTP transaction if the user agent of the current HTTP transaction matches with an entry in a predefined user agent set.

32. The apparatus of claim 29, wherein the transaction filter is configured to determine whether the current HTTP transaction relates to web browsing by determining whether a response code is in a predefined response code set, wherein the response code is acquired based on the current HTTP transaction, and accepting the current HTTP transaction if the response code is determined to be within the predefined response code set.

33. The apparatus of claim 29, wherein the transaction filter is configured to determine whether the current HTTP transaction relates to web browsing by determining whether a content type is within a predefined content type set, wherein the content type is acquired based on the current HTTP transaction, and accepting the current HTTP transaction if the content type is within a predefined content type set.

34. The apparatus of claim 29, wherein the page unit detector is configured to evaluate whether the current HTTP transaction belongs with the previous transactions set by computing a time gap between the current HTTP transaction and the previous transactions set, determining whether the time gap satisfies a predefined timing threshold condition, and associating the current HTTP transaction with the previous transactions set if the time gap satisfied the predefined timing threshold condition.

35. The apparatus of claim 29, wherein the page unit detector is configured to create a boundary of a page unit by determining whether the previous transactions set is the page unit.

36. The apparatus of claim 35, wherein the page unit detector is configured to determine whether the previous transactions set is a page unit by determining whether the previous transactions set includes at least one HyperText Markup Language (HTML) object, and accepting the previous transactions set as a page unit based at least in part on the previous transaction set including at least one HTML object.

37. The apparatus of claim 35, wherein the page unit detector is configured to determine whether the previous transactions set is a page unit by determining whether size of a largest HyperText Markup Language (HTML) object included in the previous transactions set satisfies a size threshold condition, and accepting the previous transactions set as a page unit based at least in part on the size of the largest HTML object satisfying a size threshold condition.

38. The apparatus of claim 35, wherein the page unit detector is configured to determine whether the previous transactions set is a page unit by determining whether a number of images included in the previous transactions set satisfies an image threshold condition, and accepting the previous transactions set as a page unit based at least in part on the number of images satisfying the image threshold condition.

39. The apparatus of claim 35, wherein the page unit detector is configured to determine whether the previous transactions set is a page unit by determining whether a total number of objects included in the previous transactions set satisfies a number of object threshold condition, and accepting the previous transactions set as a page unit based at least in part on the total number of objects satisfying the number of object threshold condition.

40. The apparatus of claim 35, wherein the page unit detector is configured to determine whether the previous transactions set is a page unit by determining whether a total download time satisfies a download time threshold condition, and accepting the previous transactions set as a page unit based at least in part on the total download time satisfying the download time threshold condition.

41. The apparatus of claim 29, wherein the page unit detector is further configured to acquire a first average page unit time based on predetermined page unit times of more than one client for a fixed number of objects, wherein the first average page unit time is stored in a database, acquire a second average page unit time based on predetermined page unit times of more than one client for the same number of objects included within the HTTP transactions of the previous transactions set, wherein the second average page unit time is stored in the database, and compute a normalized page unit time based on the page unit time, the first average page unit time and the second average page unit time.

42. The apparatus of claim 41, wherein the page unit detector is further configured to acquire the first average page unit time and acquire the second average page unit time based on a sliding time window.

43. An apparatus for page unit detection, comprising:
one or more computer-readable storage media configured to store instructions; and
one or more processors configured to execute the instructions to cause the apparatus to:
acquire a current Hypertext Transfer Protocol (HTTP) transaction;
determine whether the current HTTP transaction relates to web browsing;
acquire a previous transactions set of a specific client;
evaluate whether the current HTTP transaction belongs with the previous transactions set;
if the current HTTP transaction belongs with the previous transactions set, add the current HTTP transaction to the previous transactions set; and
if the current HTTP transaction does not belong with the previous transactions set, create a boundary of a page unit that includes the HTTP transactions of the previous transactions set for computing a page unit time.

* * * * *